US011948528B2

(12) United States Patent
Tsai et al.

(10) Patent No.: US 11,948,528 B2
(45) Date of Patent: Apr. 2, 2024

(54) DRIVING METHOD OF CHOLESTERIC LIQUID CRYSTAL DISPLAY

(71) Applicant: IRIS OPTRONICS CO., LTD., Tainan (TW)

(72) Inventors: Ming-Liang Tsai, Tainan (TW); Wu-Chang Yang, Tainan (TW); Chi-Chang Liao, Tainan (TW)

(73) Assignee: IRIS OPTRONICS CO., LTD., Tainan (TW)

( * ) Notice: Subject to any disclaimer, the term of this patent is extended or adjusted under 35 U.S.C. 154(b) by 0 days.

(21) Appl. No.: 18/195,934

(22) Filed: May 10, 2023

(65) Prior Publication Data

US 2023/0386426 A1 Nov. 30, 2023

(30) Foreign Application Priority Data

May 25, 2022 (TW) ................................. 111119412

(51) Int. Cl.
*G09G 3/3233* (2016.01)
*G09G 3/36* (2006.01)

(52) U.S. Cl.
CPC ................................. *G09G 3/3677* (2013.01)

(58) Field of Classification Search
CPC .............. G09G 3/3677; G02F 1/13718; G02F 2201/343
See application file for complete search history.

(56) References Cited

U.S. PATENT DOCUMENTS

| | | | |
|---|---|---|---|
| 8,427,410 | B2 | 4/2013 | Huang et al. |
| 2010/0295875 | A1 | 11/2010 | Huang et al. |

FOREIGN PATENT DOCUMENTS

| | | | |
|---|---|---|---|
| TW | 201222520 | A1 | 6/2012 |
| TW | 201423704 | A | 6/2014 |
| TW | 202203192 | A | 1/2022 |

*Primary Examiner* — Abbas I Abdulselam
(74) *Attorney, Agent, or Firm* — Cheng-Ju Chiang

(57) ABSTRACT

The present invention relates to a driving method of a cholesteric liquid crystal display. It includes the steps in the following: driving each scan line by a dynamic driving scheme (DDS) including an Evolution phase; refreshing a frame of the cholesteric liquid crystal display by a full refresh mode, each scan line driven N times during the Evolution phase in the full refresh mode; and refreshing a part of the frame by a partial-refresh mode, each scan line driven M times in the Evolution phase in the partial-refresh mode, wherein M is greater than N.

2 Claims, 3 Drawing Sheets

DRIVING METHOD OF CHOLESTERIC LIQUID CRYSTAL DISPLAY

BACKGROUND OF THE INVENTION

1. Field of the Invention

The present invention relates to a liquid crystal display, and in particular, to a cholesteric liquid crystal display (ChLCD).

2. Description of Related Art

Cholesteric liquid crystal molecules have bi-stable characteristic, that is, cholesteric liquid crystal molecules can maintain two stable states in the natural state, one of which is a Planar state, and the other state is a Focal-Conic state. In a reflective state, the cholesteric liquid crystal molecules are arranged in an orderly manner that causes them to reflect incident light of a specific wavelength, resulting in what is commonly referred to as a bright state. Conversely, in a transparent state, the cholesteric liquid crystal molecules are arranged randomly, causing incident light to be scattered and resulting in what is commonly referred to as a dark state. In the prior art, a cholesteric liquid crystal display (ChLCD) uses a dynamic driving scheme (DDS) to refresh the full screen of the cholesteric liquid crystal display (ChLCD) panel, and while a frame is refreshed, scan lines (rows) need to be addressed row by row. For example, while refreshing one scan line, it needs to go through four phases: Preparation phase, Selection phase, Evolution phase, and Non-Selection phase. In the Preparation phase, the liquid crystal molecules arrangement state will be cleared. In the Selection stage, the liquid crystal molecules will be chosen to turn on or turn off. In the Evolution stage, an electric field is applied to the liquid crystal molecules to change the ratio of the transparent state to the reflective state, thereby displaying gray levels with different reflectivity so as to maintain the liquid crystal molecules in a stable state in the Non-Selected state stage.

In order to refresh the screen more quickly, sometimes it is only necessary to refresh the required part screen of the ChLCD panel, but when refreshing part screen of the ChLCD panel, it is possible for chromatic aberration to occur (as shown in FIG. 1). For example, provided that the ChLCD panel has M (e.g. 1080) scan lines, during refresh using the dynamic driving scheme (DDS), each scan line needs a total time of Tselect+(M−1)*Tnon-select to energize the liquid crystal molecules. Tselect is the selection scan time that consists of Preparation, Selection, Evolution, and Non-Selection phases mentioned earlier. Tnon-select is the non-selected time. When refreshing a part screen of the ChLCD panel using DDS, only P out of M scan lines (e.g., 512 out of 1080) are refreshed. During this process, each scan line spends a total time of Tselect+(P−1)*Tnon-select to energize the liquid crystal molecules. Because P is less than M, the energy needed by the liquid crystal molecules during partial refresh of the ChLCD panel is lower than when the entire ChLCD panel is refreshed. As a result, the ChLCD panel appears brighter, and chromatic aberrations may occur during partial refresh compared to full refresh of the ChLCD panel.

Therefore, to overcome disadvantages mentioned above, a solution to the disadvantages mentioned above is necessary.

SUMMARY OF THE INVENTION

The present invention is to provide a driving method of a cholesteric liquid crystal display, that can improve chromatic aberrations when only a portion of the ChLCD panel is refreshed, resulting in an enhanced viewing experience for the users.

In order to achieve at least one of the advantages or other advantages, the present invention provides an embodiment, indicating a driving method for a cholesteric liquid crystal display (ChLCD), which is suitable for a cholesteric liquid crystal display (ChLCD) with multiple scan lines, and the driving method includes the steps in the following: driving each scan line with a dynamic driving scheme that includes an Evolution phase; refreshing a frame of the ChLCD in a full-frame mode, and the number of times to drive each scan line when refreshing the Evolution phase of the frame is N; refreshing a part of the frame in a partial-frame mode, and during the Evolution phase of refreshing this part of the frame, the number of times to drive each scan line is M, where M is greater than N.

In one embodiment of the present invention, N is equal to 6, and M is a value ranging from 7 to 30.

Therefore, the present invention provides a driving method of the cholesteric liquid crystal display (ChLCD), increasing the number of scans per scan line during the Evolution phase of partial-frame refresh. The present invention enables the cholesteric liquid crystal molecules to acquire more energy and alter the mixing ratio of the Focal-Conic state to the Planar state so phenomenon of chromatic aberration can be improved.

The aforementioned illustrations are exemplary for the purpose of further explaining the scope of the present invention. Other objectives and advantages related to the present invention will be illustrated in the subsequent descriptions and appended drawings.

BRIEF DESCRIPTION OF THE DRAWINGS

The foregoing features may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

DETAILED DESCRIPTION OF THE PREFERRED EMBODIMENTS

The aforementioned constructions and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of “central”, “lateral”, “up”, “down”, “right”, “left”, “upright”, “horizontal”, “top”, “bottom”, “inside”, and “outside” are used to illustrate the present invention and for clarity. It does not hint or imply that device or part mentioned should be assembled or operated in specific direction or setting. Thus, the terms used herein to describe direction are not limiting. In addition, terms “first”, and “second” is for descriptive purpose, and is not construed to or implies amount as described in technical feature of the present invention. Technical features with limitation terms “first” or “second” would illustrate or imply that one or more technical features can be included. As to detailed description of the present invention, the term “more” indicates two or more unless expressly indicated otherwise.

As to detailed descriptions of the present invention, it will be further explained that the term “assemble”, “connected to”, “connected” should be construed in broadest way, unless the context clearly indicates otherwise. For example, the term “connected” indicates that two parts may be “fixed connected” or “detachably connected” or “integrally connected”. Similarly, the term “connected” also indicates that two parts may be “mechanically connected” or “electrically connected”, and “directly connected”, “connected by intermediate part” or “internally connected by two parts”. Alterations or modifications of the terms mentioned above will be no doubt understood and obvious to those of ordinary skill in the art.

The terminology used herein is for the purpose of describing embodiments only and is not intended to limit the full scope of the invention. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, or components and the like, but do not preclude the presence or addition of one or more other features, integers, steps, operations, elements, components, and/or groups thereof.

Figure 1:
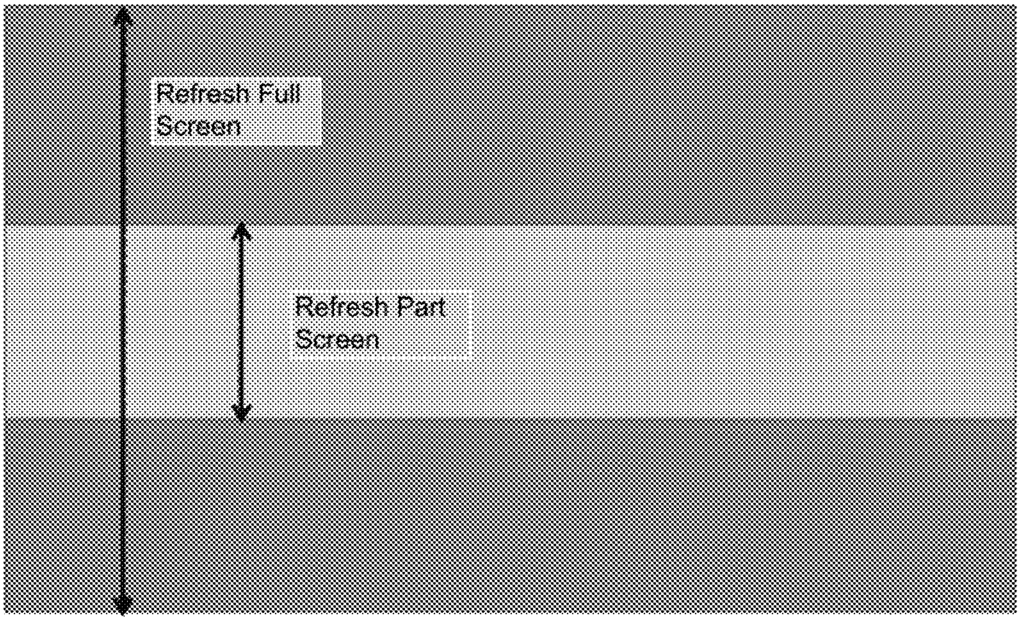
Fig. 1 (Prior Art)
FIG. 1 is a schematic diagram of full-frame refresh and partial-frame refresh of the prior art.
Figure 2:
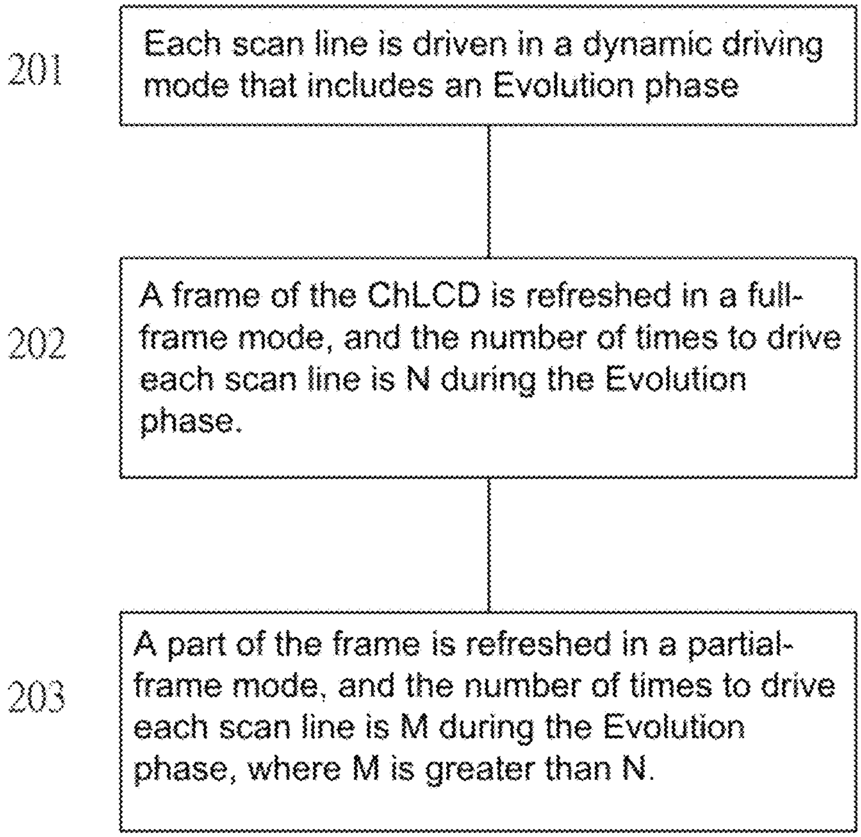
FIG. 2 is a flowchart of a driving method of a cholesteric liquid crystal display (ChLCD) according to an embodiment of the present invention.

FIG. 2 is a flowchart of a driving method of a cholesteric liquid crystal display (ChLCD) according to an embodiment of the present invention. As shown in FIG. 2, the driving method includes steps 201 to 203. In Step 201 of the driving method, each scan line is driven in a dynamic driving mode that includes an Evolution phase. In Step 202, a frame of the ChLCD is refreshed in a full-frame mode, and the number of times to drive each scan line is N during the Evolution phase. In Step 203, a part of the frame is refreshed in a partial-frame mode, and the number of times to drive each scan line is M during the Evolution phase, where M is greater than N.

Figure 3:
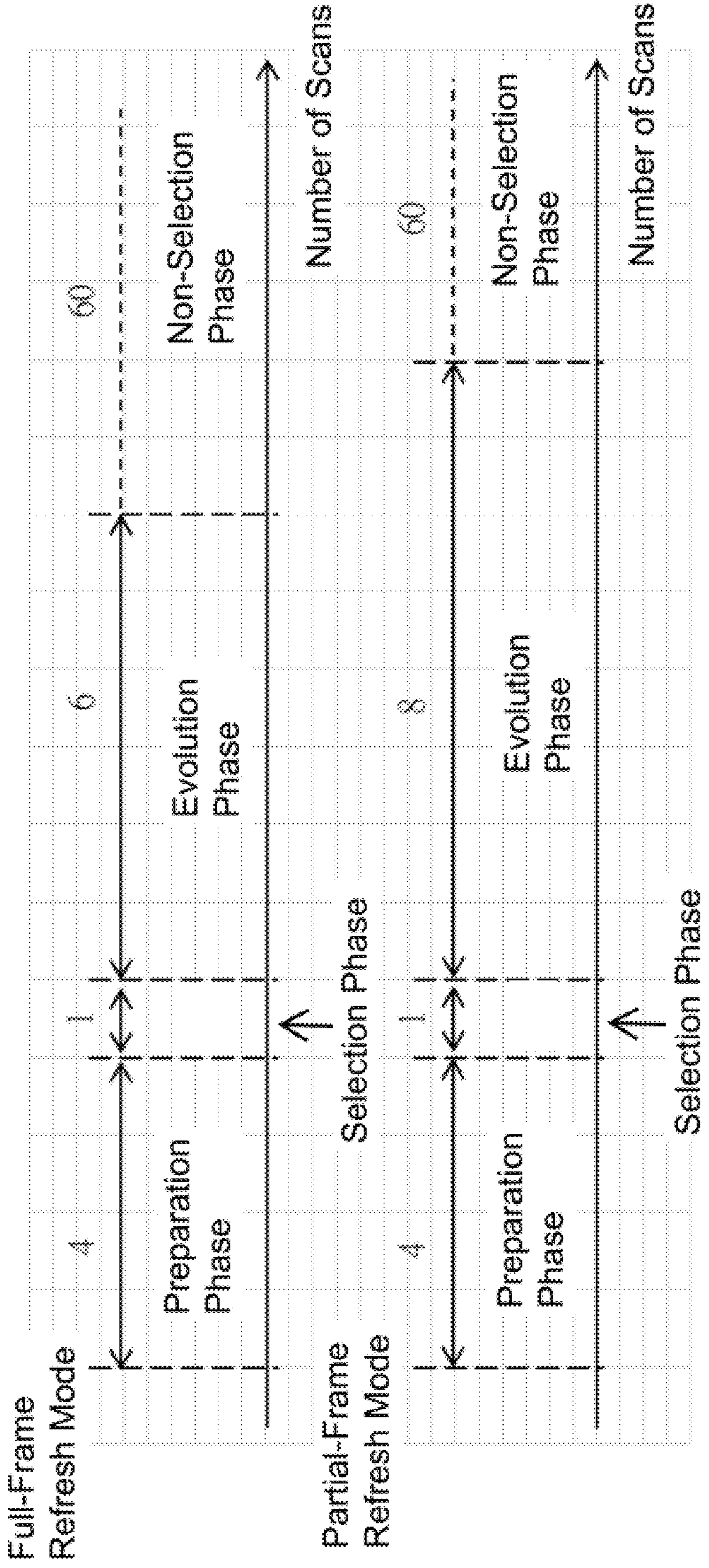
FIG. 3 is a timing diagram of full-frame and partial-frame refresh modes according to an embodiment of the present invention.

FIG. 3 illustrates a timing diagram that demonstrates how the full-frame and partial-frame refresh modes work using dynamic driving mode. The timing diagram displays four phases of the driving mode: Preparation, Selection, Evolution, and Non-Selection. These phases are specific and crucial to the refresh process. In this embodiment, during the Preparation phase of both full-frame and partial-frame refresh modes, each scan line is driven four times. In the Selection phase, each scan line is driven once, while in the Non-Selection phase, each scan line is scanned 60 times. In the full-frame refresh mode, each scan line undergoes six scans during the Evolution phase (indicated by N in FIG. 2). In contrast, in the partial-frame refresh mode, each scan line is scanned eight times during the Evolution phase (indicated by M in FIG. 2). As shown in FIGS. 2 and 3, N is equal to 6, and M is a value ranging from 7 to 30 (M equals 8 as shown in the partial frame refresh mode).

Figure 4:
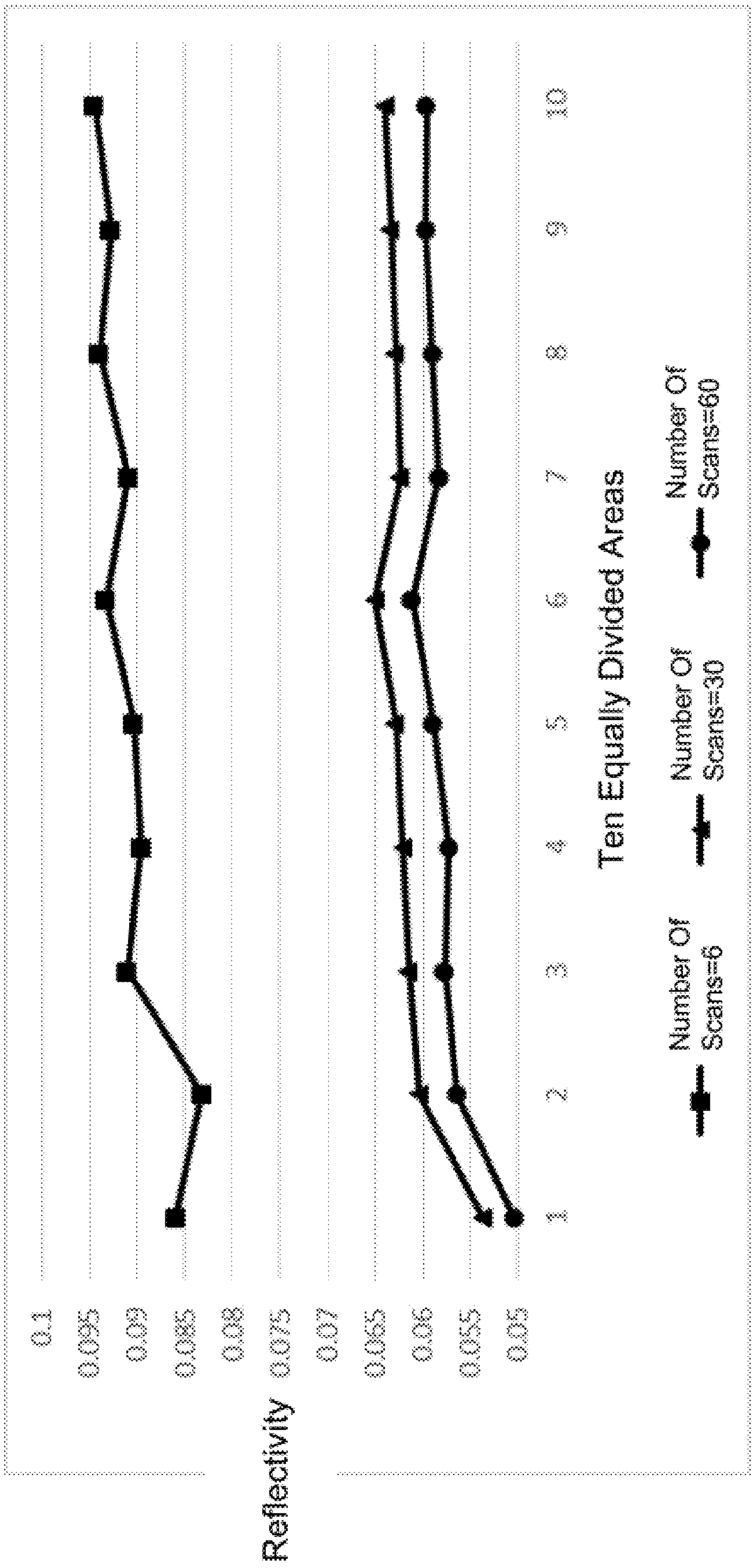
FIG. 4 is a schematic diagram of brightness reflected by different scan times for each scan line of the ChLCD during an Evolution phase in partial-frame refresh mode according to an embodiment of the present invention.

According to an embodiment of the present invention, FIG. 4 displays a schematic diagram that illustrates the brightness reflected by different scan times for each scan line of a cholesteric liquid crystal display (ChLCD) during an Evolution phase in partial-frame refresh mode. As shown in FIG. 4, the three curves from top to bottom indicate that each scan line is scanned 6, 30, and 60 times respectively, the vertical axis (abscissa) is the reflectivity (that is, brightness), while the horizontal axis (ordinate) indicates that viewing area (or screen) of the ChLCD is divided into ten equally divided areas and measured data corresponds to these divided areas. It can be inferred from FIG. 4 that when the number of scans of each scan line in the Evolution phase during the partial-frame refresh mode is greater than that during the full-frame refresh mode (e.g., 30 or 60 times), the reflectivity or brightness of the ChLCD will decrease accordingly. For example, if a completely black screen is displayed on the ChLCD, a lower reflectivity of the ChLCD will result in a darker display of the viewing area, which increases the contrast ratio. The reflectivity of each area that is divided into 10 equal parts of the viewing area of the ChLCD will be relatively uniform to help reduce the occurrence of chromatic aberration. Besides, when the number of scans per scan line exceeds 30 (e.g., 60 scans), the rate of decrease in reflectivity tends to decrease.

Since the number of times each scan line is scanned during the Evolution phase in the partial-frame refresh mode is greater than the number of scans during the Evolution phase in the full-frame refresh mode. Thus, when only part of the ChLCD is refreshed in the partial-frame refresh mode, it enables the liquid crystal molecules to acquire more energy and adjust the mixing ratio of the Focal-Conic state to the Planar state. This results in improved contrast and reduced chromatic aberration.

To sum up, the present invention provides a driving method for a cholesteric liquid crystal display that aims to reduce chromatic aberration in both full-frame and partial-frame refresh modes. This is achieved by increasing the number of times each scan line is scanned during the Evolution phase in partial-frame refresh mode, allowing the cholesteric liquid crystal molecules to acquire more energy and adjust the mixing ratio of the Focal-Conic state to the Planar state. It brings a better viewing experience for the viewers.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A driving method for a cholesteric liquid crystal display, suitable for a cholesteric liquid crystal display (ChLCD) with multiple scan lines the method comprises:
- driving each scan line with a dynamic driving scheme that includes an Evolution phase;
- refreshing a frame of the ChLCD in a full-frame mode, and when refreshing the Evolution phase of the frame, the number of times to drive each scan line is N; and
- refreshing a part of the frame of the ChLCD in a partial-frame mode, and during the Evolution phase of refreshing the part of the frame, the number of times to drive each scan line is M, wherein M is greater than N.

2. The driving method for a cholesteric liquid crystal display according to claim 1, wherein N is equal to 6, and M is a value ranging from 7 to 30.

* * * * *